US007005171B2

(12) United States Patent
Lerner et al.

(10) Patent No.: US 7,005,171 B2
(45) Date of Patent: Feb. 28, 2006

(54) COLOR DISPLAY PRODUCT WITH REMOVABLE COLOR CHIPS AND A METHOD FOR MAKING SAME

(75) Inventors: Stanley I. Lerner, Glencoe, IL (US); Steven B. Winter, Highland Park, IL (US)

(73) Assignee: Color Communications, Inc., Chicago, IL (US)

( * ) Notice: Subject to any disclaimer, the term of this patent is extended or adjusted under 35 U.S.C. 154(b) by 0 days.

(21) Appl. No.: 10/190,751

(22) Filed: Jul. 8, 2002

(65) Prior Publication Data

US 2003/0072907 A1 Apr. 17, 2003

Related U.S. Application Data

(63) Continuation of application No. 09/328,840, filed on Jun. 9, 1999, now Pat. No. 6,416,612.

(51) Int. Cl.
*B32B 33/00* (2006.01)
*G09B 19/00* (2006.01)
*B32D 15/00* (2006.01)

(52) U.S. Cl. .................. 428/41.8; 428/40.1; 428/41.9; 428/42.2; 428/42.3; 434/98; 283/81

(58) Field of Classification Search .................. 434/98; 428/40.1, 41.9, 42.2, 42.3, 41.8; 283/81
See application file for complete search history.

(56) References Cited

U.S. PATENT DOCUMENTS 4,457,718 A * 7/1984 Lerner ......................... 434/98
4,884,680 A * 12/1989 Israel et al. .............. 206/44.11
5,704,650 A * 1/1998 Laurash et al. ............... 283/81
6,217,078 B1 * 4/2001 Roth et al. .................... 283/81

FOREIGN PATENT DOCUMENTS

GB 1 386 888 * 3/1975
GB 2 287 220 A * 9/1995

OTHER PUBLICATIONS

Ashland Specialty Polymers and Adhesives, Pressure Sensitive Adhesives, http://162.128.70.45/SPA/SPA1.html, 1997.*

Gel-Tac Adhesives, reprinted Apr. 4, 2003 at http://www.msphere.com/geltac.htm.*

* cited by examiner

*Primary Examiner*—Harold Pyon
*Assistant Examiner*—Patricia L. Nordmeyer
(74) *Attorney, Agent, or Firm*—Fitch, Even, Tabin & Flannery

(57) ABSTRACT

The color card or display device of the invention has one or more paint color swatches or chips which are removable from a base and are repositionable and adhesively affixable to another substrate remote from the color card or display device. The color card with repositionable paint swatches provides swatches which may be remounted onto furniture, walls, other samples and fabrics to aid the consumer of the color to select the color on the swatch and match it with other colors and the environment for which the color is intended.

9 Claims, 2 Drawing Sheets

COLOR DISPLAY PRODUCT WITH REMOVABLE COLOR CHIPS AND A METHOD FOR MAKING SAME

This is a continuation of prior application Ser. No. 09/328,840, filed Jun. 9, 1999, now U.S. Pat No. 6,916,612, which is hereby incorporated herein by reference in its entirety.

FIELD OF THE INVENTION

The present invention relates to color sample display devices for paint and other colored products. More particularly, the present invention is directed to color sample display devices such as color cards which have one or more colored swatches which are removable from a mount base.

BACKGROUND OF THE INVENTION

A problem exists in the display of color such as paint colors wherein a color display card often displays a plurality of colors with a plurality of color chips or swatches on a mount base or display card. Often the viewer desires to view the color remote from the card without the distraction of the display product and/or other colors on the card. Heretofore, color or paint chips have not been removable from the mount base and remountable remote from the mount base because adhesives holding the color chips on the card would tear the mount base or chip or pulled layers of paper from the mount base as the chip was removed. Alternatively, prior to the invention herein, adhesives and mounting system which would permit chip removal would either not attractively hold the chips onto the mount base or would provide a bond so weak that there was a likelihood that the color chips would be unintentionally lost from the mount base and card.

Color display devices need to display the color on the chips or swatches attractively. This requires a high degree of control as to the placement of the adhesive on a mount base for the chips or swatches. Moreover, to provide a display device with removable chips or swatches, the device must have swatches which not only are removable, but which may be removed without rendering the card unattractive because the chips are ripped or torn or having layers of the mount base removed with the removal of the adhesively affixed chip or swatch.

An object of this invention is to provide a color display device with one or more colored swatches which are adhesively affixed to a mount base, but which may be removed and displayed remotely from the mount base by adhesively affixing the swatch to an alternate substrate.

Another object of the invention is to provide a color display device with a removable chip or chips, but also control the placement and application of adhesive and release composition layers under the chip, which layers removably hold the chips on the mount base.

SUMMARY OF THE INVENTION

This invention is directed to a color card or painted color sample display device for the illustration of color. The invention also is directed to a method for making such a color card or display device. The color card or display device of the invention has one or more painted color swatches or chips which are removable from a base and are repositionable and adhesively affixable to another substrate remote from the color card or display device. The color card with repositionable painted swatches provides swatches which may be remounted onto furniture, walls, other samples and fabrics to aid the consumer of the color to select the color on the swatch and match it with other colors and the environment for which the color is intend. In one embodiment, the color card or sample display device includes a mount base, a printed release composition on the mount base, a printed indirect pressure sensitive adhesive on the printed release composition layer, and a painted color substrate or swatch for the illustration of color. The pressure sensitive indirect adhesive, which releasably binds the painted swatch to the printed release composition on the mount base, has about 0.8 to about 3.0 oz. per inch bond strength using a 180 degree peel adhesion test after about a 24 hour dwell time and a minimum of about 250 grams of wet tack bond strength contact placement within about 30 seconds or less. Alternately, a pressure sensitive direct adhesive may be coated on the surface of the chip which faces the release composition and base to releasably bond the chip to the printed release composition. In this aspect, the direct adhesive does not have to be printed, but may be applied by a till box, a known method for applying a permanent adhesive.

The color substrate or swatch may be paper which is coated with paint, and in an important aspect, the color substrate may be a polymeric film such as polypropylene film or polyethylene terephthalate film, commonly sold under the name of Mylar. These polymeric films are less likely to rip as compared to paper and have a thickness in the range of from about 1.35 to about 4.6 mils, and preferably, from about 1.6 to about 2.6 mils. Paint is applied to these films for the illustration of color including the color of not only paints, but inks and other colored materials. The use of paint is important for the precise color matching of the swatch color with the color of the article which the swatch is to illustrate.

When the polymer films are thin, such as when the films have a thickness of from about 1.35 to about 1.6 mils, a paper tissue or thin paper reinforcing agent is adhesively affixed to the film forming a film/paper laminate. The film/paper laminate is releasably affixed to the release composition with the direct or indirect pressure sensitive adhesive.

In another aspect, the color card or sample display device includes a mount base, a printed permanent adhesive layer printed on the mount base, a release liner layer permanently and adhesively affixed to the permanent adhesive layer, a release composition layer on the surface of the release liner layer opposite to the surface of the release liner layer which is affixed to the permanent adhesive, an indirect adhesive layer on the release composition layer, a paint coated color substrate or swatch which is releasably and adhesively bonded onto the indirect adhesive layer. Alternately, a direct adhesive may be applied to the surface of the paint coated color substrate which faces and is releasably affixed to the release composition. In this aspect of the invention, paper or a polymeric film is releasably and adhesively affixed with an indirect or direct adhesive onto the surface of the release liner having the release composition. The surface of the release liner facing the paper or film chip surface is coated with a release composition layer so that the paper or film serves as a paint chip which may be removed from the release liner. The surface of the release liner, which is opposite the surface of the release liner having the release composition, is permanently and adhesively affixed to the mount base with a permanent adhesive printed on the mount base. In this aspect of the invention, paper or film is painted with the sample color and is bonded to the surface of the release liner which is coated with the release composition. The opposite surface of the release liner is bonded onto the mount base with the permanent adhesive. The paper or film substrate which is painted and which forms the painted chip then may be readily removed from the mount base for illustration of the paint color remote from the card and mount base. In this aspect, after the painted chip is removed from the mount base, the release liner remains permanently adhesively affixed to the mount base with the permanent adhesive.

The method of the invention includes printing a mount base with a release composition to provide a printed release composition layer, drying and/or curing with heat or light (such as U.V. light) the release composition layer, printing a pressure sensitive indirect adhesive on the release composition layer to provide a pressure sensitive indirect adhesive layer, mounting a display swatch to the printed pressure sensitive indirect adhesive layer. The release composition and adhesive layers may be printed onto the mount base by lithographic printing, Gravure printing, flexographic printing and silk screen printing. In an important aspect, the release composition layer and the pressure sensitive indirect adhesive are printed onto their respective base layers by a lithographic printing process. The release composition is lithographically printed onto the mount base and then the pressure sensitive indirect adhesive is lithographically printed on the dried release composition layer. The color swatches may be mounted onto the printed adhesive on the mount base using a till box, as is known in the art, or a high speed mounting machine as described in U.S. Pat. No. 4,061,521 to Lerner. Indeed, printing the indirect adhesive onto the release composition is highly adaptable with such a high speed machine.

In another aspect the method of the invention includes printing a mount base with a permanent adhesive, applying a release composition to the surface of a release liner, applying an indirect adhesive onto the surface of the release composition or a direct adhesive to the chip substrate and laminating a paint coated film or paper substrate onto the surface of the release liner with the indirect or direct adhesive to provide a release liner/painted substrate laminate, and then mounting the release liner/painted substrate laminate to the permanent adhesive which is printed onto the surface of the mount base.

DESCRIPTION OF THE PREFERRED EMBODIMENTS

Definitions

"Indirect adhesive" means a pressure sensitive adhesive which releasably binds an object to a substrate base. An indirect adhesive is applied to a base to which the object is mounted and when the object is removed from the base, the indirect adhesive will transfer to or move to the object and the object will retain adhesive which will permit the object to be adhesively mounted to another base. Further, the indirect adhesive should be capable of being printed. Suitable indirect adhesives include but are not limited to acrylic emulsion polymers which are commercially available as Aroset 2538 and 2539 from Ashland Chemical Company, and microsphere acrylic polymers which are commercially available as 271 Series Adhesive Gel-Tac Acrylic Polymers from Advanced Polymers International.

"Direct adhesive" means an adhesive which removably affixes an object onto a base or substrate on a base, but does not transfer to the object being removed from the substrate. When it is used in the invention, the direct adhesive is applied directly to the chip substrate which then is bonded to the release composition. The direct adhesive may be applied by roll coating or any known method. A suitable direct adhesive includes but is not limited to an acrylic polymer microspheres commercially available as Gel-Tac 101 Series and Gel-Tac 102 series from Advanced Polymers International.

A "releasable adhesive" is an indirect or direct adhesive which releasably bonds an object to a substrate.

"Permanent adhesive" means an adhesive which does not releasably affix an object to a substrate, but rather permanently affixes the object to the substrate. Suitable permanent adhesives include a copolymer of polyvinyl acetate commercially available as Crodafix 57-066 from Croda Adhesives, Inc., Itasca, Ill., and Resyn (R) 33-9245, available from National Starch Company. The permanent adhesive should be printable.

"Release composition" means a composition which is coated onto a release liner or on an object to be adhesively affixed to the indirect or direct adhesive to facilitate the removal of the object which is adhesively affixed to a base with the indirect or direct adhesive. Suitable release compositions include but are not limited to a wax and varnish blend which is suitable to release an object affixed with Aroset adhesives; a free radical UV silicone release composition commercially available from Croda Adhesives, Inc., as Croda 30-19-3; a cationic UV silicone release composition commercially available from Croda Adhesives as Croda 30-24-1; a two component thermoset release composition commercially available as Croda 24-26-2 parts 1 and 2; and conventional commercially available silicone release compositions. The Croda and conventional silicone release compositions are suitable for use with the Aroset indirect adhesive and the 271 indirect adhesives from Advanced Polymers International.

"Release liner" means a paper or polymeric film which may be coated with a release composition to facilitate the removal of an object from the release liner and movement of an indirect adhesive to the object or retention of a direct adhesive on an object, such that the object may be removably adhesively affixed to a substrate other than the release liner.

DESCRIPTION OF THE DRAWINGS

Referring to FIG. 1 of the drawing, a display card 10 includes a mount base 12 which may be paper, plastic or other suitable material for the display of colored chips or swatches. Although the mount card is shown with a plurality of chips mounted thereon, a strip of color chips or the mount card may be used to display only one color chip or color per mount card as in U.S. Pat. No. 4,104,809 to Day et al. The mount card may be made of any suitable material to which a paper chip or a chip made from an organo polymeric film may be affixed. In an important aspect, the mount card is thick paper or cardboard.

As seen in FIG. 2 the chip 14 is releasably affixed to an indirect or direct adhesive layer 18. The indirect or direct adhesive layer is on a layer of release composition 20 which has been printed onto the mount base 12. In most applications such as when the chip is a paper chip, the chip will have a paint layer 22 which is on the surface of the chip opposite the surface of the chip which interfaces with the indirect or direct adhesive coating on the chip. The adhesive coating interfaces with the surface of the chip which is opposite surface of the chip which has the paint coating. In this aspect the paint coating faces away from the mount base and the surface of the chip which interfaces with the adhesive coating faces the mount base.

Figure 2:
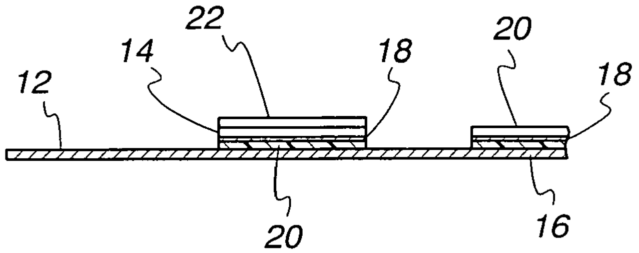
FIG. 2 is the side view of the paint chip card of FIG. 1 along line 2—2.
Figure 3:
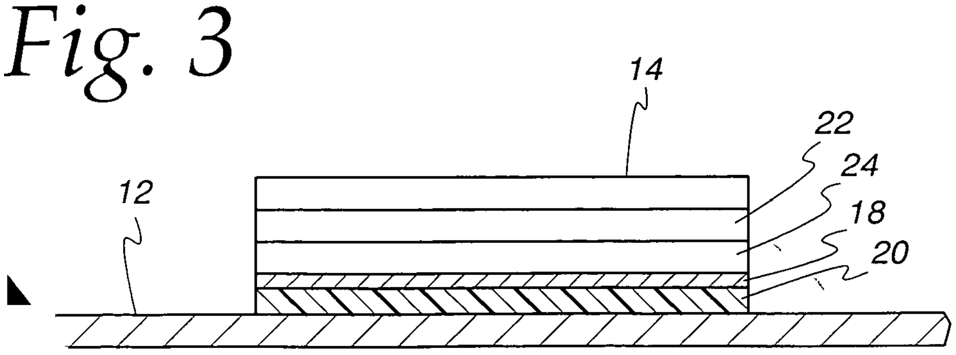
FIG. 3 is a side view of a paint chip card using a paint coated polymeric film chip where the paint is coated on the side of the film facing the mount base.

In an alternate embodiment shown in FIG. 3, the chip is made from an organo polymeric film such as acrylic coated polyproplylene or polyethylene terephthalate. Polyethlyene terephthalate is also known as Mylar which is a registered trademark of E. I. DuPont DeNemours & Co. The acrylic coated polypropylene and polyethylene terephthalate films provide a transparent film base which as a thickness in the range of from about 1.35 mils to about 4.60 mils (one mil is 0.001 inch). Paint is applied to the film. In one aspect the paint layer 22 is on the surface of the film facing the mount base. Thinner polymeric films having a thickness in the range of from about 1.35 to about 1.6 mils are bonded or laminated onto thin paper or tissue paper to give them more body and make them easier to handle during the manufacture of the color display device. This paper or tissue provides a paper layer 24, as seen in FIG. 3, which is bonded onto the adhesive layer 18. In this aspect of the invention, the adhesive layer is on a layer of release composition 20 which has been printed onto the mount base 12. In the aspect of the invention shown in FIG. 3, the paint coating 22 to be displayed is applied to the polymeric film chip on the side of the film which will be facing the mount base. The chip will be viewed from the side of the translucent film which is opposite to the side having the paint coating. (Hereinafter the "bottom side" of the polymeric film base). With thicker films the side of the polymeric base with the paint coating, or bottom side, will interface with the adhesive. With thinner films which are laminated with the paper tissue, the paper tissue 24 will interface with the adhesive and the paint on the film will be observed through the film from the "top" of the film which is secured to the mount base 12 through the release composition 20, indirect or direct adhesive 18, tissue 24 and paint 22 layers, as seen in FIG. 3. In this aspect of the invention the translucency of the film may be utilized and the paint may be displayed with a high gloss finish because the chip is affixed to the mount base with the unpainted polymeric surface of the chip facing away from the mount base, as seen in FIGS. 2 and 3. The polymeric film thereby permits the display of the paint coating through the film, and hence, with a glossy finish without the problem of having the glossy surface fuse to an overlying surface, such as when the cards are stored in stacked relation. In the art this fusing is commonly known as "blocking".

Figure 4:
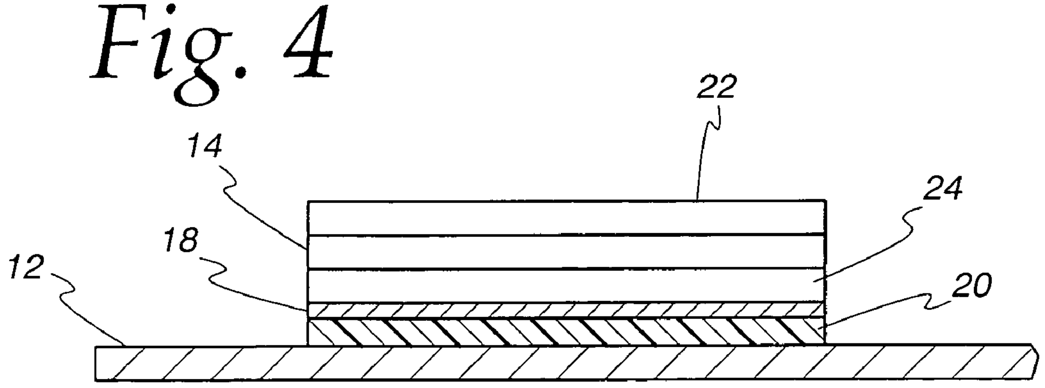
FIG. 4 is a side view of a paint chip card using a paint coated polymeric film chip where the paint is coated on the side of the film facing the observer and opposite to the side of the film which faces the release composition and indirect or direct adhesive.

Alternatively, the paint coating may be in the "top" surface of the film chip as seen in FIG. 4. In this aspect the surface of the paint is viewed directly, and the film chip 14 is bonded onto the mount base 12 through the tissue paper 24, adhesive layer 18, and release composition layer 20.

In the aspect of the invention shown in FIGS. 1 through 4, the color display devices are made by printing the release composition onto the mount base. The printing process permits precise control the area or areas of the mount base to which the release composition is applied. The release composition layer may be printed onto the mount base by lithographic printing, Gravure printing, flexographic printing and silk screen printing. The release composition which is printed onto the mount base is described in the definition section above. In an important aspect, the release composition used is a free radical UV silicone release composition such as Croda 30-19-3. The release composition layer provides a surface to which a releasable adhesive may bond, but the surface of the release composition is tough and will permit removal of the chip without removing layers of paper from a mount base or tearing the mount base or chip with removal of the color chip.

After the release composition layer is printed and dried on the mount base, an indirect adhesive layer is printed onto the dried release composition layer. As with the release composition layer, the indirect adhesive layer may be printed onto the mount base by lithographic printing, Gravure printing, flexographic printing and silk screen printing. The printing process also permits precise control of the placement of the adhesive layer. Pressure sensitive adhesives such as an acrylic adhesive which are available as acrylic aqueous emulsions are ideal for use in the invention. As described above, indirect adhesives are available from the Ashland Chemical Company under the trademark AROSET, such as the AROSET 2528 acrylic emulsion polymer adhesive. Alternately, but less preferably, the direct adhesive may be applied to the chip substrate.

To make the paint or color chip, paper or polymeric film is painted with a paint coating composition to make the chips which are removably affixed to the mount base. Generally, the paint coating composition is lacquer paint, but when polymeric films are used for the chips or swatches, aqueous or latex paints may be applied to the film which permits reduction of volatile organic compound emissions. The coating of the paper or polymeric film may be by a knife over roll coating operation where a knife spreads the paint over the paper or film substrate as the substrate is conveyed under the knife by rollers as is known. The paint also may be applied by a roller-roller operation as is known. After the paper of film substrate is coated with paint, the paint coated paper or coated polymeric film is cut into strips and then swatches using a guillotine, as is known. Thereafter, the cut swatches are applied to the mount base by means of the printed indirect adhesive printed on the mount base or the direct adhesive applied to the chip. This mounting may be done with a till box as is known, or using a high speed mounting machine as is generally describe in U.S. Pat. No. 4,061,521 to Lerner et al., assigned to Color Communications, Inc. This patent is incorporated by reference as if fully rewritten herein.

Figure 1:
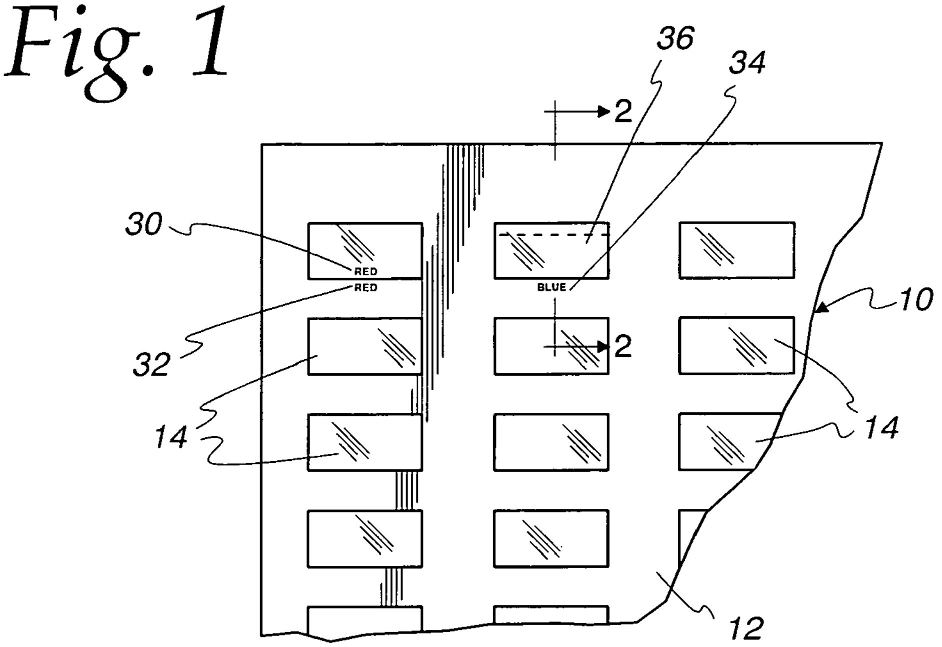
FIG. 1 is a top view of a paint chip card with a plurality of paint coated chips or swatches.

Referring to FIG. 1 the color of the chips or swatches may be identified by printing 30 on the chip which identification also may correspond to an identification of the color printed on the mount base as seen at 32. Indeed, in an important aspect, the printing of the release composition is done at the time the mount base is printed with graphics, such as pictures and/or text. Also referring to FIG. 1, the identification of the chip color may be achieved by printing the name of the color on the mount base as seen at 34, but to retain association of the name of the color with the paint on the chip, the chip is perforated as at 36 so that a portion of the chip is retained on the card with the printed name even though a portion of the chip has been removed by tearing along the perforation for remote display of the chip and its color.

The color display device of the invention provides one or more paint coated swatches, which are removable from the mount base. After removal from the mount base, the indirect adhesive moves to the chip or the direct adhesive is retained on the chip or swatch such that the chip may be removably adhesively affixed to an alternate substrate remote from the color display device. In this way the colored paint coated swatch may be removed from the display device or card and the colored or paint coated chip may be adhesively applied to a wall or furniture to permit the viewer to evaluate the color such as a paint color in the environment in which the color or paint is to be used.

Figure 5:
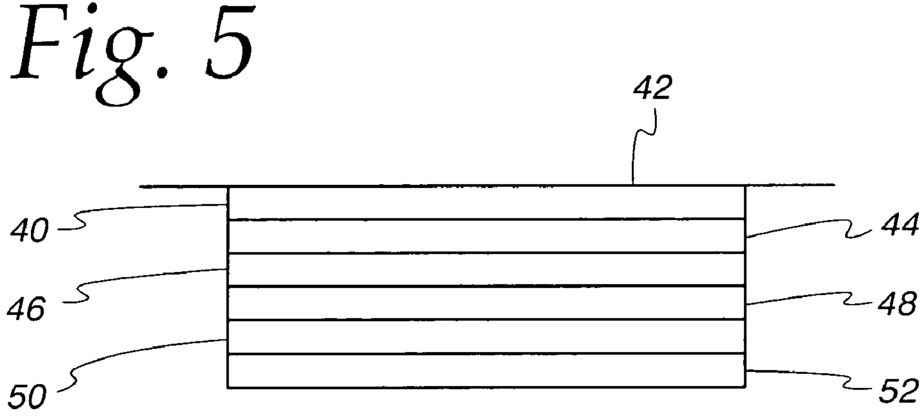
FIG. 5 is a side view of an alternate aspect of the invention where the paint chip is adhesively affixed to a mount base with a permanent adhesive and a release liner is affixed to the permanent adhesive, the opposite side of the release liner adhesively holding a chip substrate with an indirect or direct adhesive.
Figure 6:
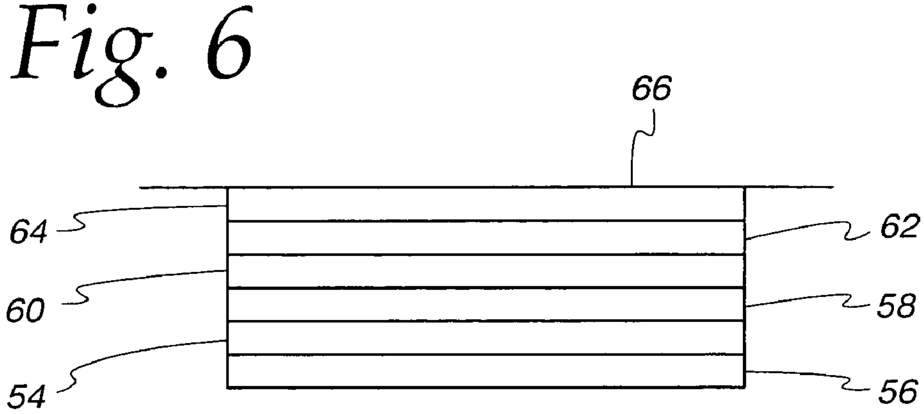
FIG. 6 is a side view of an alternate aspect of the invention similar to the paint chip card of FIG. 5, but the paint chip is a polymeric film with a paint coating on the surface of the film opposite the side seen by an observer.

An alternate aspect of the invention is illustrated in FIGS. 5 and 6. In this aspect of the invention, a permanent adhesive 40 is printed onto mount base 42. A release liner coated with a release composition, the release composition coated with an indirect adhesive or a chip substrate is coated with a direct adhesive. The paper or film chip bonded to the surface of the direct or indirect adhesive provide a release liner 44/release composition 46/indirect or direct adhesive 48/chip substrate 50 laminate which is bonded onto the permanent adhesive printed onto the mount base 42. A paint coating 52 may be on the surface of the substrate facing the observer (on the "top" of the paint chip). Alternatively, as seen if FIG. 6 the paint coating 56 may be on the bottom of the paint chip 58 where the chip is made of a clear film. As seen in FIG. 6, a laminate which includes a film substrate 56/a paint layer 54/an indirect or direct adhesive 58/a release composition 60/a release liner 62 is bonded onto a printed permanent adhesive 64 printed onto the mount base 66. In this aspect of the invention, the film if thin also may be given additional body with a tissue paper layer (not shown in this aspect of the invention). In this aspect of the invention the release liner is permanently adhesively affixed to the mount base, but the painted chip may be peeled from the release liner for remote display of the chip.

What is claimed is:

1. A color display device, the display device comprising:

a mount base;

a plurality of areas of printed release composition arrayed on the mount base, which areas form a plurality of discrete areas of printed release composition layers on the mount base;

a plurality of areas of printed pressure sensitive adhesive arrayed on discrete areas on the mount base and on the discrete areas of printed release composition, which areas form a plurality of pressure sensitive adhesive layers on selected discrete areas of the mount base and on the plurality of the discrete areas of release composition layers on the mount base, the printed pressure sensitive adhesive not covering the entire mount base;

a plurality of paint coated color swatches arrayed on the mount base such that the swatches and the mount base are viewable at the same time prior to removal of any swatch, the plurality of paint coated color swatches on the printed pressure sensitive adhesive layers, the color swatches including a tear line which divides the swatch into at least two portions, a first portion which is affixed to discrete areas on the mount base with the adhesive printed on the mount base and a second portion releasably affixed to the discrete areas of printed release composition, the second portion repositionable from the mount base remote from the color display device for releasably bonding onto a remote substrate; and color identification indicia printed on one of or both the mount base and first portions of the swatches.

2. A color display device as recited in claim 1 wherein the second portions of the paint coated swatches have printed color identification indicia and the mount base has printed color identification indicia in the vicinity of the swatches.

3. A color display device as recited in claim 1 wherein the second portions of the paint coated swatches have printed color identification indicia and the first portions of the paint coated swatch have printed color identification indicia.

4. A color display device, the display device comprising:

a mount base;

a plurality of areas of printed release composition arrayed on the mount base, which areas form a plurality of discrete areas of printed release composition layers on the mount base;

a plurality of areas of printed permanent adhesive arrayed on discrete areas on the mount base, which areas form a plurality of permanent adhesive layers on the mount base;

a plurality of areas of printed releasable pressure sensitive adhesive arrayed on the discrete areas of the plurality of printed release composition layers on the mount base mount base, which discrete areas of releasable pressure sensitive adhesive on selected discrete areas of printed release composition form a plurality of releasable pressure sensitive adhesive layers on the plurality of the release composition layers on the mount base, the printed permanent adhesive and printed pressure sensitive adhesive not covering the entire mount base;

a plurality of paint coated color swatches arrayed on the permanent adhesive layers and on the releasable pressure sensitive adhesive layers such that the swatches and the mount base are viewable at the same time prior to removal of any swatch from the mount base, the color swatches including a tear line which divides the swatches into at least two portions, a first portion which is affixed to the mount base with the discrete areas of permanent adhesive layers printed on the mount base and a second portion releasably affixed with the printed releasable adhesive layer to the discrete areas of the printed release composition on the mount base, the second portion repositionable from the mount base remote from the color display device for releasably bonding onto a remote substrate; and color identification indicia printed on one of or both the mount base and first portions of the swatches.

5. A color display device as recited in claim 4 wherein the second portions of the paint coated swatches have printed color identification indicia and the mount base has printed color identification indicia in the vicinity of the swatches.

6. A color display device as recited in claim 4 wherein the second portions of the paint coated swatches have printed color identification indicia and the first portions of the paint coated swatch have printed color identification indicia.

7. A color display device, the display device comprising:

a mount base;

a plurality of areas of printed release composition arrayed on the mount base, which areas form a plurality of discrete areas of printed release composition layers on the mount base;

a plurality of areas of printed pressure sensitive adhesive arrayed on discrete areas on the mount base and discrete areas of printed release composition, which areas form a plurality of pressure sensitive adhesive layers on the mount base and on the plurality of the discrete areas of printed release composition layers on the mount base, the printed pressure sensitive adhesive not covering the entire mount base;

a plurality of paint coated polymeric film color swatches, the polymeric film selected from the group consisting of polypropylene and polyethylene terephthalate, the paint coated film swatches arrayed on the mount base such that the swatches and the mount base are viewable at the same time prior to removal of any swatch, the paint coated film color swatches including a tear line which divides the swatch into at least two portions, a first portion which is affixed to the discrete areas mount base with a printed adhesive printed on the mount base and a second portion releasably affixed to the discrete areas of printed release composition, the second portion repositionable from the mount base remote from the color display device for releasably bonding onto a remote substrate; and color identification indicia printed on one of or both the mount base and first portions of the swatches.

8. A color display device as recited in claim 7 wherein the second portions of the paint coated swatches have printed color identification indicia and the mount base has printed color identification indicia in the vicinity of the swatches.

9. A color display device as recited in claim 7 wherein the second portions of the paint coated swatches have printed color identification indicia and the first portions of the paint coated swatch have printed color identification indicia.

* * * * *